United States Patent [19]

Schwanda

[11] Patent Number: 5,653,578
[45] Date of Patent: Aug. 5, 1997

[54] VERTICAL-AXIS WATERPOWER MACHINE

[75] Inventor: Josef Schwanda, Lupfig, Switzerland

[73] Assignee: ABB Management AG, Baden, Switzerland

[21] Appl. No.: 522,923

[22] Filed: Sep. 1, 1995

[30] Foreign Application Priority Data

Oct. 4, 1994 [DE] Germany .................. 44 35 440.1

[51] Int. Cl.⁶ .................................................... F03B 11/06
[52] U.S. Cl. .................. 415/132; 416/174; 384/308; 384/312; 384/248
[58] Field of Search .................. 416/174; 415/131, 415/132; 384/308, 312, 248, 263, 264

[56] References Cited

U.S. PATENT DOCUMENTS

| | | | |
|---|---|---|---|
| 1,441,614 | 1/1923 | Wadsworth | 384/308 |
| 3,276,742 | 10/1966 | Yokoi | 416/174 |
| 4,421,426 | 12/1983 | Furukawa | 384/308 |
| 4,657,411 | 4/1987 | Bath | 384/308 |

FOREIGN PATENT DOCUMENTS

0586861A1  3/1994  European Pat. Off. .

*Primary Examiner*—James Larson
*Attorney, Agent, or Firm*—Oblon, Spivak, McClelland, Maier & Neustadt, P.C.

[57] ABSTRACT

In a vertical-axis waterpower machine, the shaft is mounted in a bearing-supporting star. It has a track ring for a supporting bearing. Supporting-bearing segments are supported via adjusting elements on a supporting ring firmly connected to the bearing-supporting star. To simplify the construction and improve the accessibility of the adjusting elements, the latter are designed as rocking levers. The rocking levers act as single-armed or double-armed levers and are elastic in the lever longitudinal direction.

18 Claims, 4 Drawing Sheets

5,653,578

VERTICAL-AXIS WATERPOWER MACHINE

BACKGROUND OF THE INVENTION

1. Field of the Invention

The invention relates to a vertical-axis waterpower machine having a shaft mounted in a bearing-supporting star, which shaft has a track ring for a supporting bearing, and supporting-bearing segments are provided which are supported via adjusting elements on a supporting ring firmly connected to the bearing-supporting star.

EP-0 586 861 A1, for example, discloses a vertical-axis waterpower machine of this generic type.

2. Discussion of Background

Electrical machines having a vertical shaft and greater power output are all equipped with segmental bearings. In the case of a large machine diameter, the bearing is supported on a bearing-supporting star. In the known machine, the segments of the supporting bearing are supported via adjusting spindles on a closed bearing-supporting ring which is fastened in turn to a supporting ring of the bearing-supporting star. Since these adjusting spindles have to be accessible from below, the overall height of the machine cannot be reduced at will. The distance of the supporting bearing from the rotor center, which determines, inter alia, the critical rotational speed of the machine, is also limited toward the bottom.

SUMMARY OF THE INVENTION

Accordingly, one object of the invention is to provide a novel vertical-axis waterpower machine, the supporting-bearing segments of which are individually adjustable and which permits a small overall height at optimum accessibility of the adjusting elements.

This object is achieved according to the invention when the adjusting elements are designed as radially extending rocking levers, which rocking levers act on the supporting ring on the one hand and on the supporting-bearing segment on the other hand, and when the free lever arm acts on the bearing-supporting star via adjusting means.

The rocking levers can act as either single-armed or double-armed levers, the shorter lever arm in each case coming to lie radially to the inside and between the supporting ring and the supporting-bearing segment.

In this way, the adjustment of the segments is shifted radially outward, specifically into an area which is readily accessible. Compared with conventional solutions, the expensive machining of the surfaces on the supporting arms on which the adjusting spindles are supported is dispensed with.

The rocking levers take up little space in the axial direction. Their space requirement in this dimension is comparable with known elastic segment-supporting arrangements having spring plates or spring beds. Depending on the geometry of the rocking levers, e.g cross-section and/or length of the longer lever arm, these rocking levers are elastic transversely to their longitudinal direction. Thus the support of the supporting-bearing segments also becomes flexibly resilient. It is possible to precalculate the bending of the rocking levers (bending beam) under load in a very accurate manner. It can easily be measured during assembly. Even during operation, monitoring of the deflection of the "beam" is easily possible, e.g. with known capacitive distance transducers.

Exemplary embodiments of the invention as well as the further advantages achievable with it are described in more detail below with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b shows the detail X from FIG. 2a;

DESCRIPTION OF THE PREFERRED EMBODIMENTS

Figure 1A:
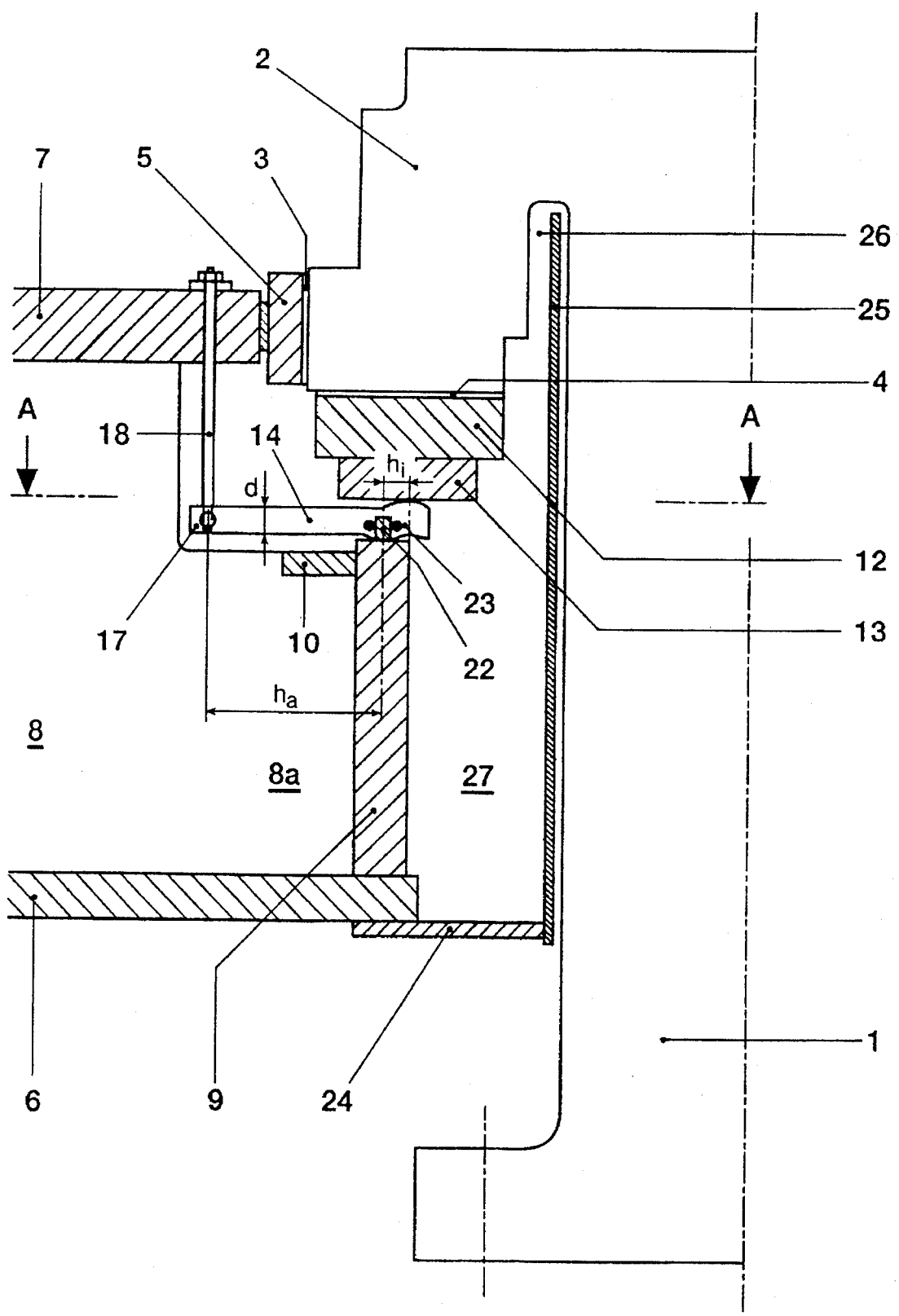
FIG. 1a shows a part of a longitudinal section through a vertical-axis waterpower machine, the shaft of which is formed in one piece with the supporting head and has individually adjustable supporting-bearing segments which are supported by means of double-armed rocking levers.
Figure 1B:
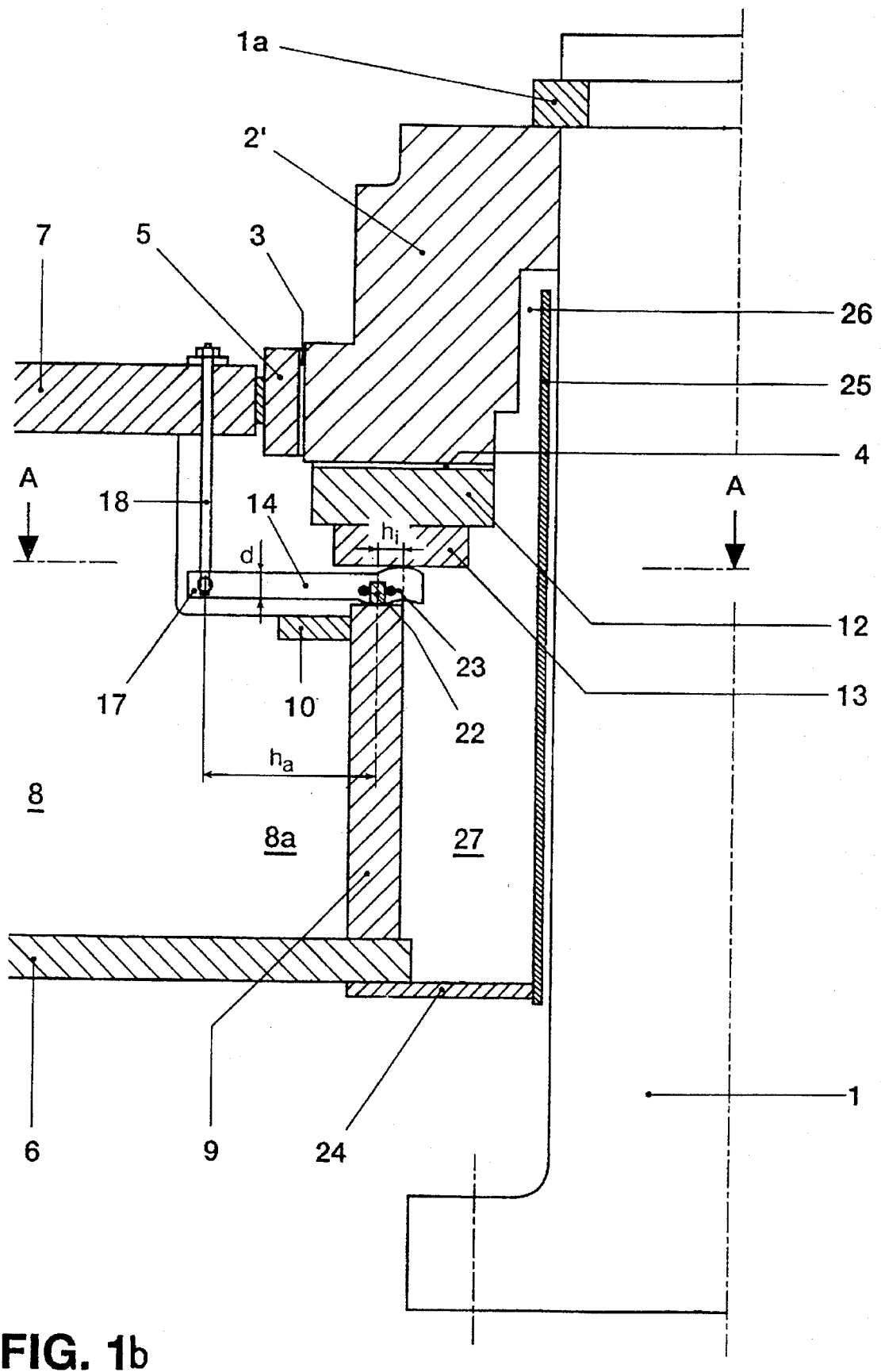
FIG. 1b shows a waterpower machine comparable with FIG. 1a in longitudinal section having a separate supporting head.

Referring now to the drawings, wherein like reference numerals designate identical or corresponding parts throughout the several views, in FIG. 1a or FIG. 1b a shaft 1 of a vertical-axis waterpower machine is formed in one piece with a supporting head 2, or the supporting head 2' is of two-piece construction with the shaft 1, the shaft 1 being carried by a support ring 1a. The supporting head 2 has a running surface 3 of the guide bearing at the outer periphery and a running surface 4 of the supporting bearing at the end face. The guide-bearing segment 5 of the guide bearing is supported on the inner periphery of the bearing-supporting star, of which only the bottom ring 6, the tension ring, and the top ring 7, the compression ring, as well as a radial rib 8 connecting the two rings 6 and 7 can be seen in FIG. 1a.

The ribs 8 are provided with a recess at the radially inner end. A supporting ring 9 is welded all round to the projecting end 8a of all the ribs 8 and to the bottom ring 6 of the bearing-supporting star. A stiffening ring 10 is put onto the radially extending edges of the projecting ends 8a of the ribs 8 and is welded to the latter.

Figure 3:
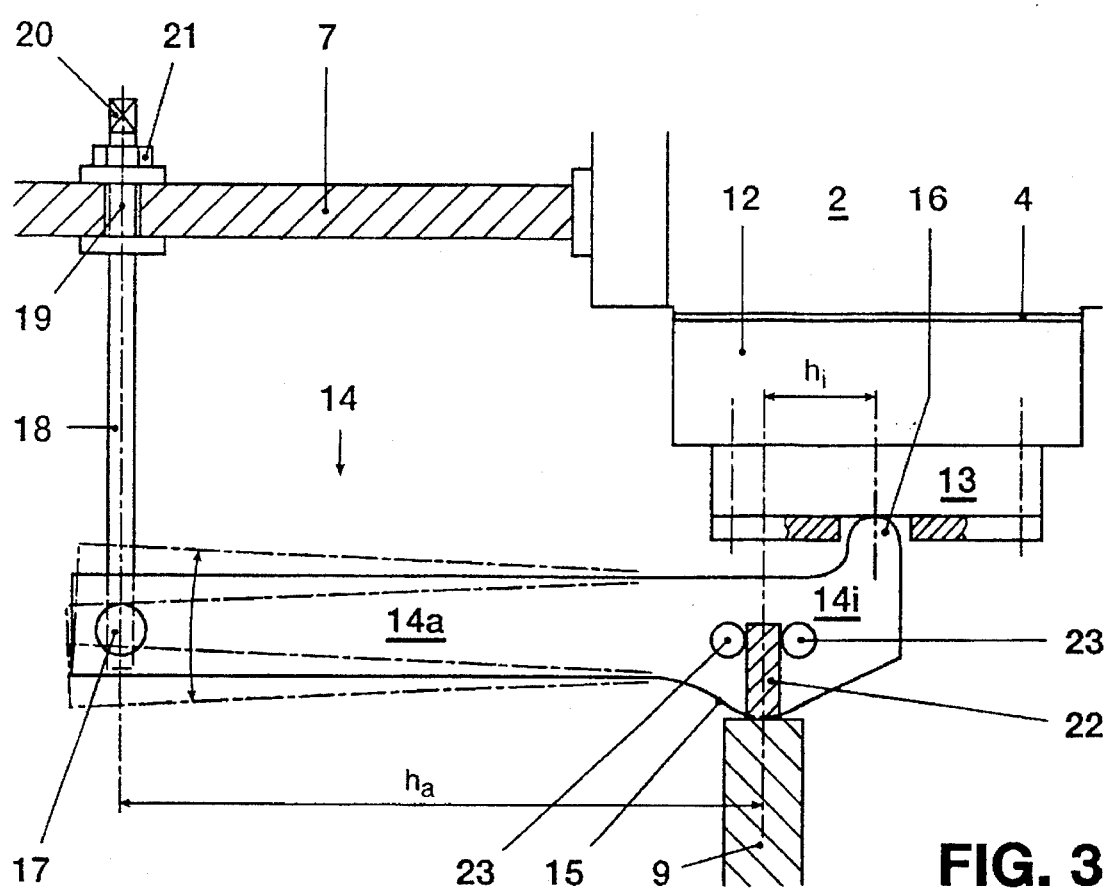
FIG. 3 shows an enlarged side view of a rocking lever.

The supporting-bearing segments 12 each lie on a segment plate 13. Rocking levers 14 are provided for the vertical adjustment of the supporting-bearing segments 12. As shown in FIG. 3 by the enlarged representation compared with FIG. 1a, the rocking levers 14 are designed as double-armed levers. They have no fulcrum in the actual sense. Their "fulcrum" is formed by a widened material portion 15 in the shape of a cylinder section on the underside of the rocking lever 14, which widened material portion 15 rests on the top end face of the supporting ring 9. A spherical widened material portion 16 which bears against the underside of the segment plate 13 is provided on the top side at the radially inner end of the rocking lever 14.

Provided at the radially outer end of the rocking lever 14 is a horizontal bore in which there is a pin 17 having a tapped hole extending transversely to the longitudinal axis of the pin. Screwed into the tapped hole is a threaded rod 18 which is guided by a threaded sleeve 19 in the top ring 7 of the bearing-supporting star. The top end of the threaded rod 18 has a square 20. A lock nut 21 serves as locking means. After the lock nut 21 is slackened, the rocking lever 14 can be moved up or down by turning the threaded rod 18 counter-clockwise or clockwise, and thus the associated segment plate 13 and the associated supporting-bearing segment 12 can be pressed to a greater or lesser degree against the running surface 4 of the supporting bearing. Each segment load can be accurately determined and set by measuring the deflection of the rocking lever 14. The ratio of the lever arms $h_i/h_a$ (14i, 14a) is freely selectable here within wide limits, the length of the outer, longer lever arm $h_a$ (14a) and its cross-section also having an influence on the elasticity of the support of the supporting segment.

The distance d between the underside of the rocking lever 14 and the radially extending edge of the projecting end 8a of the rib 8 serves as an easy-to-determine guiding dimension during assembly of the machine. It can also be easily monitored during operation, for example in a manner known per se by means of capacitive distance measurement.

Figure 2A:
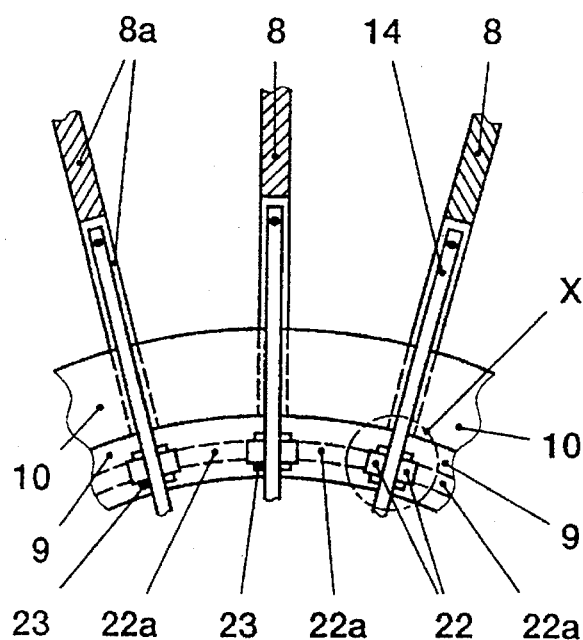
FIG. 2a shows a cross-section through the machine according to FIG. 1a along its line AA.
Figure 2B:
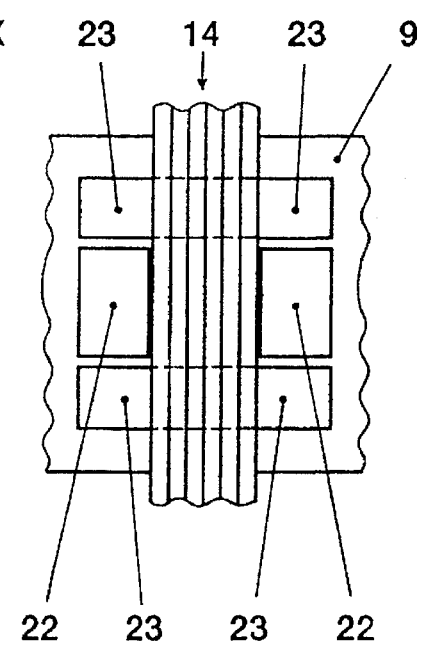

According to FIG. 2b, lugs 22 or ring segments 22a (shown by broken lines in FIG. 2a) are provided in pairs on the top end face of the supporting ring 9 in order to laterally guide the rocking levers 14. These lugs 22 or ring segments 22a prevent displacement of the rocking levers 14 in the peripheral direction as a result of torque. The rocking levers 14 are secured in the radial direction by means of horizontally extending pins 23, arranged in pairs, in the rocking levers 14.

The supporting bearing and guide bearing are closed off in a known manner relative to the shaft 1 at the bottom and toward the bearing-supporting star. Thus the sealing at the bottom, for assembly reasons, is effected by a two-piece or multi-piece sealing ring 24 which is screwed radially on the outside to the bottom ring 6. The bottom end of a tube 25 enclosing the shaft is fastened radially on the inside to the sealing ring 24. This tube 25 ends in a deep turned groove 26 in the supporting head 2, which turned groove and also the tube 25 extend in the axial direction beyond the running surface 3 of the guide bearing.

The sealing toward the bearing-supporting star is effected by a dividing wall (not shown in FIG. 1a) which is welded to the two rings 6 and 7 and to the ribs 8 and normally has an assembly opening which can be closed by an assembly cover and has likewise been omitted in FIG. 1a.

Without leaving the scope of the invention, a host of refinements of the subject matter of the invention present themselves, which are to be briefly outlined below.

Figure 4:
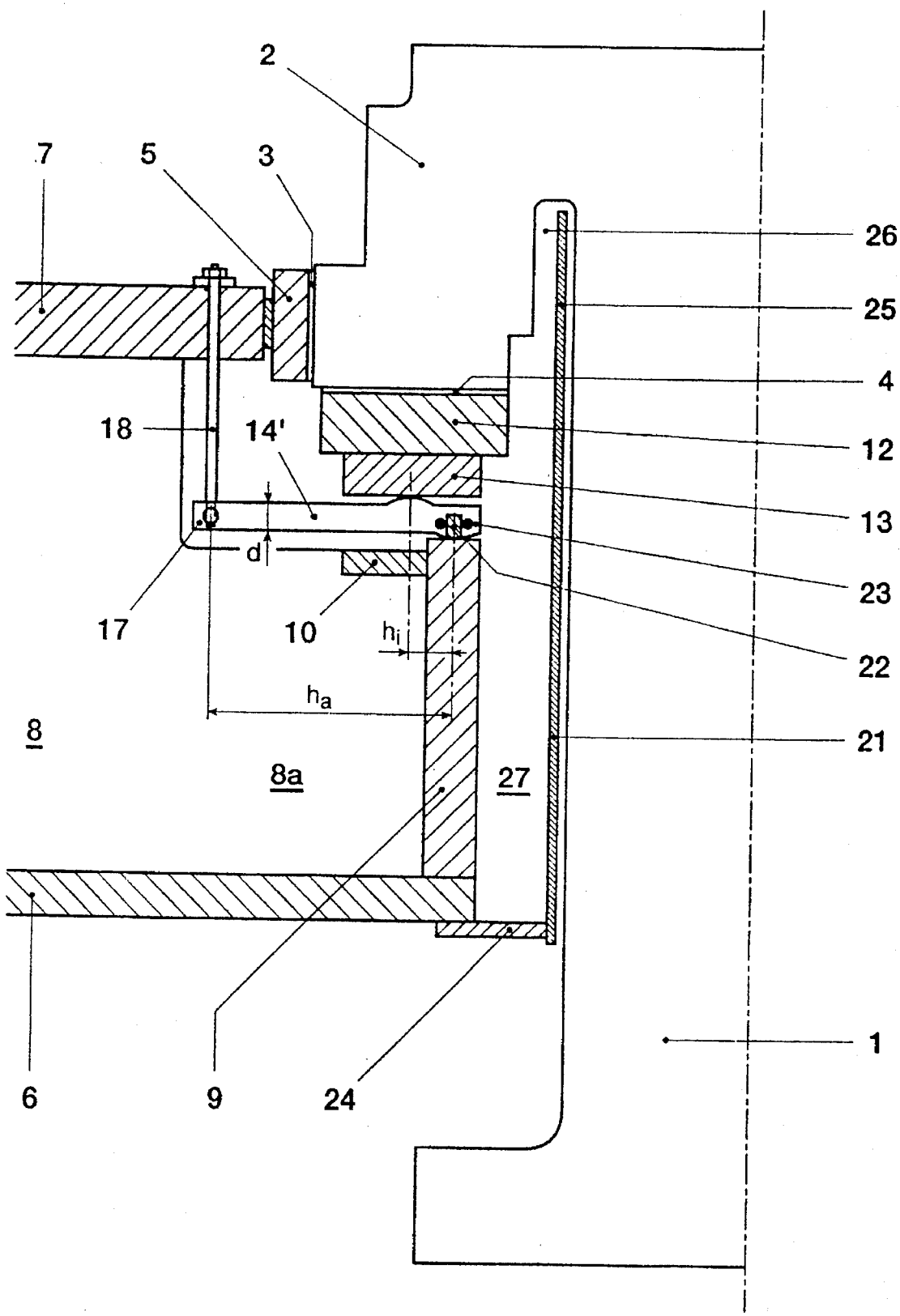
FIG. 4 shows an alternative embodiment of the support of the supporting-bearing segments having single-armed rocking levers.

Instead of a rocking lever 14 acting as a double-armed lever, a rocking lever 14' acting as a single-armed lever can also be used according to FIG. 4, but this reduces the space between shaft 1 and supporting ring 9, the so-called pump chamber 27.

As apparent from FIG. 2a, the rocking levers each lie in the direction of the radial ribs 8. However, they can also each be arranged between two adjacent radial ribs 8. One or more rocking levers 14 or 14' can also be provided per supporting-bearing segment.

The rocking levers 14 themselves can be of solid construction. However, it is advantageous to compose the rocking levers 14 of thin individual plates (cf. FIG. 2b) similar to one another which are cut out by means of laser-cutting machines and are welded or riveted to one another.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertical-axis waterpower machine comprising:
   a shaft mounted in a bearing-supporting star, said shaft having an integrated supporting head; and
   supporting-bearing segments which are supported via adjusting elements on a supporting ring, the supporting ring being connected to the bearing-supporting star;
   wherein the adjusting elements comprise radially extending rocking levers, said rocking levers acting on said supporting ring and on said supporting-bearing segments, and each of said rocking levers comprises at least one lever arm portion which acts on the bearing-supporting star via adjusting means;
   wherein each of the rocking levers forms a single-armed lever, a fulcrum of each of the rocking levers lying on said supporting ring, each of said rocking levers comprising said at least one lever arm portion and a further lever arm portion, said further lever arm portion being a shorter lever arm portion and acting on the supporting-bearing segment, and said at least one lever arm portion being a longer lever portion acting on the bearing-supporting star via said adjusting means, said shorter lever arm portion and said longer lever arm portion being both positioned on one side of said fulcrum.

2. The waterpower machine as claimed in claim 1, wherein means are provided for securing the rocking levers in a radial direction.

3. The waterpower machine as claimed in claim 1, wherein the rocking levers are composed of individual plates similar to one another.

4. The waterpower machine as claimed in claim 1, wherein means are provided for securing the rocking levers in a peripheral direction.

5. A vertical-axis waterpower machine comprising:
   a shaft mounted in a bearing-supporting star, said shaft having a separate supporting head with a ring for carrying the shaft; and
   supporting-bearing segments which are supported via adjusting elements on a supporting ring, the supporting ring being connected to the bearing-supporting star;
   wherein the adjusting elements comprise radially extending rocking levers, said rocking levers acting on said supporting ring and on said supporting-bearing segments, and each of said rocking levers comprises at least one lever arm portion which acts on the bearing-supporting star via adjusting means;
   wherein each of the rocking levers forms a single-armed lever, a fulcrum of the rocking lever lying on said supporting ring, each of said rocking levers comprising said at least one lever arm portion and a further lever arm portion, said further lever arm portion being a shorter lever arm portion and acting on the supporting-bearing segment, and said at least one lever arm portion being a longer lever arm portion acting on the bearing-supporting star via said adjusting means, said shorter lever arm portion and said longer lever arm portion both being positioned on one side of said fulcrum.

6. The waterpower machine as claimed in claim 5, wherein means are provided for securing the rocking levers in a radial direction.

7. The waterpower machine as claimed in claim 5, wherein the rocking levers are composed of individual plates similar to one another.

8. The waterpower machine as claimed in claim 5, wherein means are provided for securing the rocking levers in a peripheral direction.

9. A vertical-axis water power machine comprising:

a shaft mounted in a bearing-supporting star, said shaft having an integrated supporting head; and supporting-bearing segments which are supported via adjusting elements on a supporting ring, the supporting ring being connected to the bearing-supporting star;

wherein:

the adjusting elements comprise radially extending rocking levers, said rocking levers acting on said supporting ring and on said supporting-bearing segments, and each of said rocking levers comprises at least one lever arm which acts on the bearing-supporting star via adjusting means; and each of the rocking levers forms a double-armed lever, a fulcrum of each of the rocking levers lying on said supporting ring, each of said rocking levers comprising said at least one lever arm and a further lever arm, said further lever arm being a shorter lever arm lying substantially radially inwardly of said supporting ring and acting on the supporting-bearing segment, and said at least one lever arm being a longer lever arm acting on the bearing-supporting star via said adjusting means.

10. The waterpower machine as claimed in claim 9, wherein means are provided for securing the rocking levers in a radial direction.

11. The waterpower machine as claimed in claim 9, wherein the rocking levers are composed of individual plates similar to one another.

12. The waterpower machine as claimed in claim 9, wherein means are provided for securing the rocking levers in a peripheral direction.

13. The waterpower machine as claimed in claim 9, wherein said shorter lever arm and said longer lever arm are positioned on opposite sides of the fulcrum.

14. A vertical-axis waterpower machine comprising:

a shaft mounted in a bearing-supporting star, said shaft having a separate supporting head with a ring for carrying the shaft; and supporting-bearing segments which are supported via adjusting elements on a supporting ring, the supporting ring being connected to the bearing-supporting star;

wherein:

the adjusting elements comprise radially extending rocking levers, said rocking levers acting on said supporting ring and on said supporting-bearing segments, and each of said rocking levers comprises at least one lever arm which acts on the bearing-supporting star via adjusting means; and each of the rocking levers forms a double-armed lever, a fulcrum of each of the rocking levers lying on said supporting ring, each of said rocking levers comprising said at least one lever arm and a further lever arm, said further lever arm being a shorter lever arm lying substantially radially inwardly of said supporting ring and acting on the supporting-bearing segment, and said at least one lever arm being a longer lever arm acting on the bearing-supporting star via said adjusting means.

15. The waterpower machine as claimed in claim 14, wherein means are provided for securing the rocking levers in a radial direction.

16. The waterpower machine as claimed in claim 14, wherein means are provided for securing the rocking levers in a peripheral direction.

17. The waterpower machine as claimed in claim 14, wherein the rocking levers are composed of individual plates similar to one another.

18. The waterpower machine as claimed in claim 14, wherein said shorter lever arm and said longer lever arm are positioned on opposite sides of the fulcrum.

* * * * *